June 12, 1962 M. P. HERSHEY 3,038,518
TUBELESS TIRE
Filed Nov. 20, 1956 5 Sheets-Sheet 1

INVENTOR.
MELVIN P. HERSHEY
BY W. A. Fraser
ATTY.

June 12, 1962 M. P. HERSHEY 3,038,518
TUBELESS TIRE
Filed Nov. 20, 1956 5 Sheets-Sheet 2
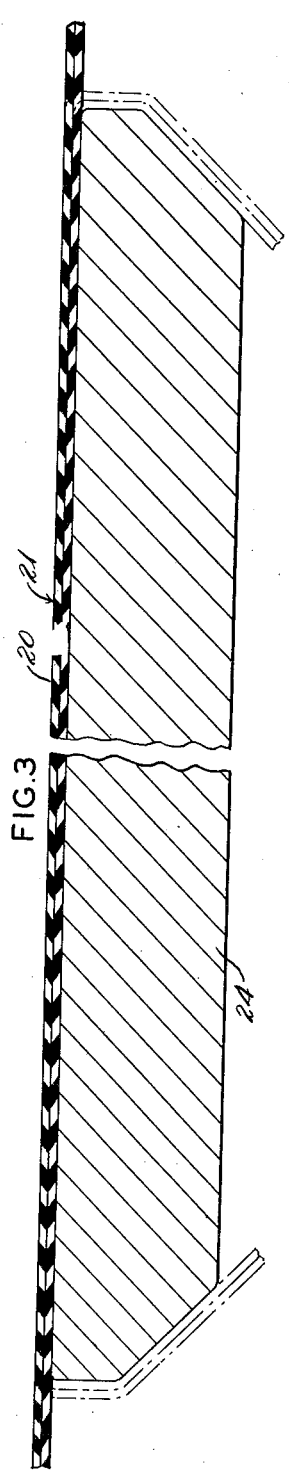
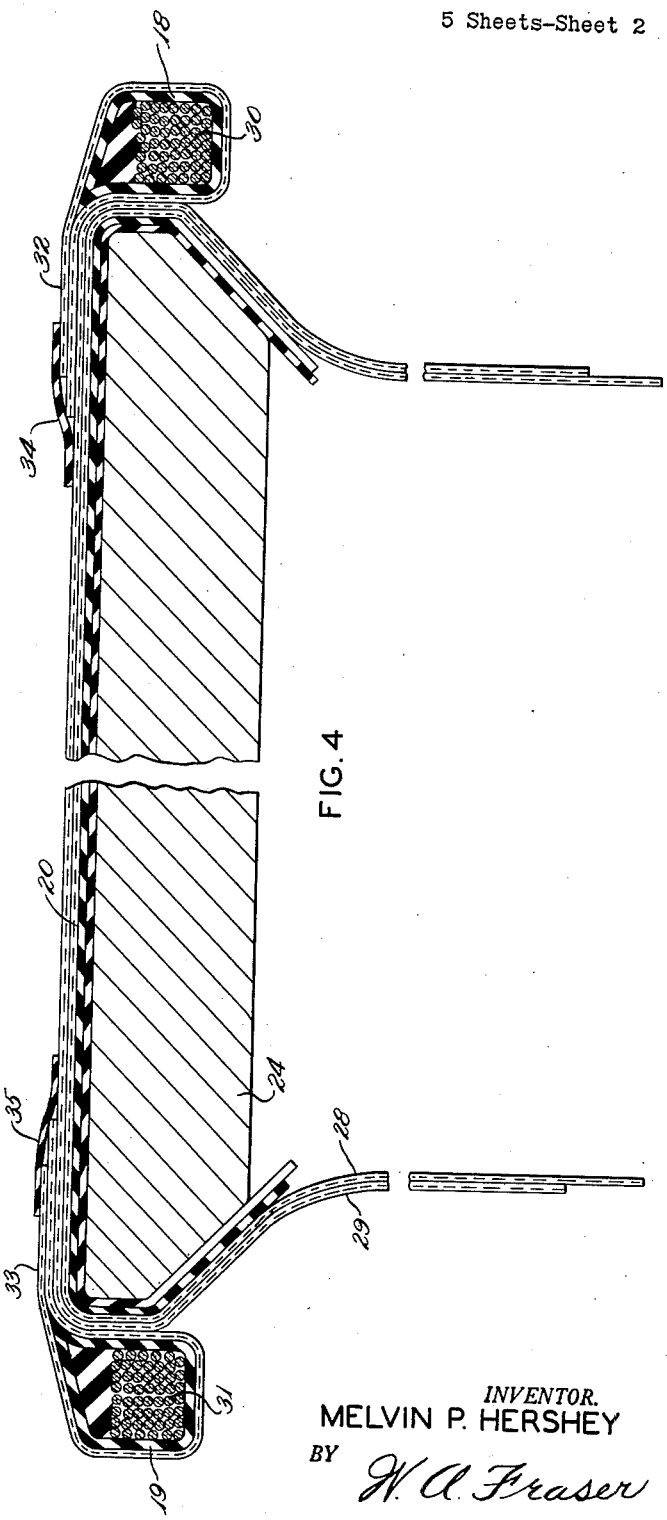
INVENTOR.
MELVIN P. HERSHEY
BY W. A. Fraser
ATTY.

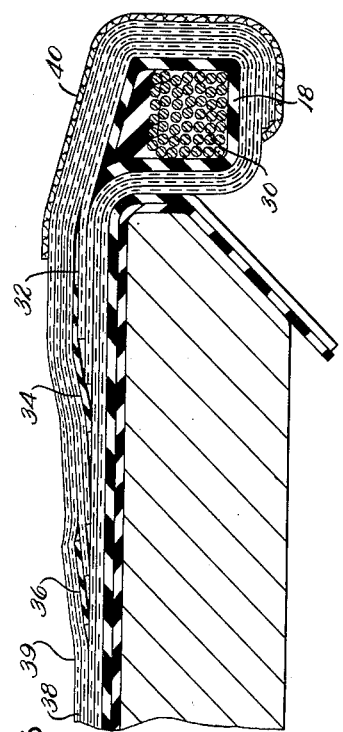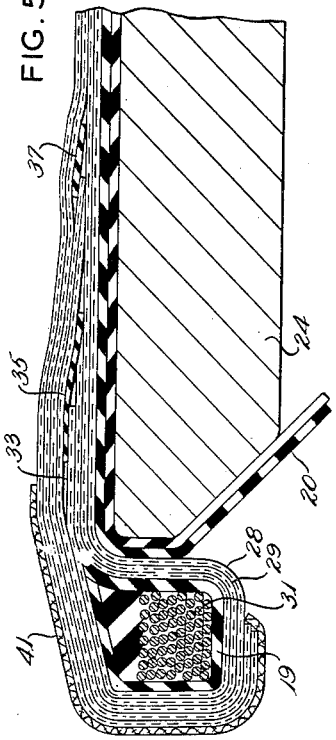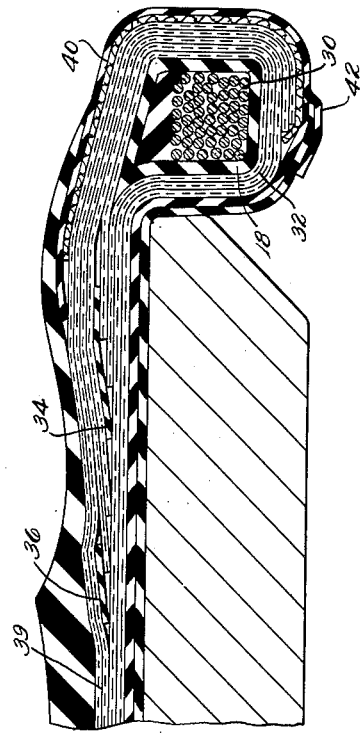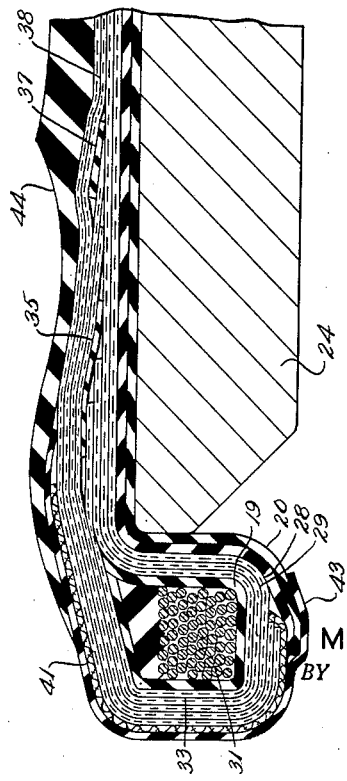
FIG. 5
FIG. 6
INVENTOR.
MELVIN P. HERSHEY
BY W. A. Fraser
ATTY.

June 12, 1962  M. P. HERSHEY  3,038,518
TUBELESS TIRE

Filed Nov. 20, 1956  5 Sheets-Sheet 4

INVENTOR.
MELVIN P. HERSHEY
BY W. A. Fraser
ATTY.

June 12, 1962  M. P. HERSHEY  3,038,518
TUBELESS TIRE

Filed Nov. 20, 1956  5 Sheets-Sheet 5

*INVENTOR.*
MELVIN P. HERSHEY
BY W. A. Fraser
ATTY.

United States Patent Office 3,038,518
Patented June 12, 1962

3,038,518
TUBELESS TIRE
Melvin Paul Hershey, Akron, Ohio, assignor to The Firestone Tire & Rubber Company, Akron, Ohio, a corporation of Ohio
Filed Nov. 20, 1956, Ser. No. 623,361
10 Claims. (Cl. 152—362)

This invention relates to a pneumatic tire of the tubeless type and has as its broad object the provision of means for preventing the inflationary air of a tire from escaping between the beads of the tire and the tire rim and by channeling through the cords of the chafer strip. This application is a continuation-in-part of application Serial No. 301,720, filed July 30, 1952, now abandoned.

Heretofore, resort to various expedients has been had to prevent air leaking by the tire beads but none of these have been completely satisfactory. One such expedient has been the forming of continuous circumferentially extending ribs of rubber upon the tire beads. Another expedient has been to form a flexible tire bead toe of such nature that when the tire is inflated, the toe would flutter against the tire rim and thereby act as a valve to seal air within the tire. Further expedients have been to make a tight fit between the radially inner surface of the tire bead and the tire rim; to employ sealing materials such as viscous rubber, caulking material and other types of sealing materials disposed between the tire and the tire rim.

While some of these and other expedients not mentioned have proven more or less successful, it has been found that leakage of the inflationary air into the tire chafers has permitted said air to by-pass such expedients and to escape to the atmosphere or to enter the cords of the chafer fabric or the ply fabric where it often causes sidewall blistering or ply separation. A general object of the invention is to provide an open bead type pneumatic tubeless tire comprising a chafer strip composed of air-impervious fabric.

A specific object of the present invention is to provide a chafer strip for a tubeless tire which chafer is woven or otherwise fabricated of air-impervious material in the form of monofilaments or sheets and which chafer may be processed in the stock preparation departments, of a tire factory, in a conventional manner, and be applied to the tire without special handling, said chafer strip serving its purpose in the tire fully as well or better than chafer strips of the prior art. A further object is to provide a pneumatic tubeless tire of the open beaded type having an air-impervious chafer strip composed of nylon or other plastic monofilaments of open weave monofilaments or unwoven in the form of a web of parallel monofilaments; or in the form of a solid or perforated sheet of nylon or other impervious plastic materials which will afford abrasion resistance to the bead where it contacts the metal rim and at the same time will be impervious to the passage of inflationary air from the interior of the tire cavity. Thus the tire will be provided with a nylon bearing both on the bottom of the bead and on the side of the bead where the bead contacts the tire rim base and side flange respectively.

The present invention is illustrated in relation to a tubeless tire of the type having a relatively air-impermeable inner lining but the invention is not to be limited to any particular type of tubeless tire as it is useful for any tubeless tire and for tire chafers for conventional tires.

These and other objects will be apparent from the following description, reference being had to the drawings in which:

FIG. 3 is an elevation broken away and partly in sectional view through a tire building drum showing the lining of FIG. 2 in its initial position on said drum;

Figure 8:
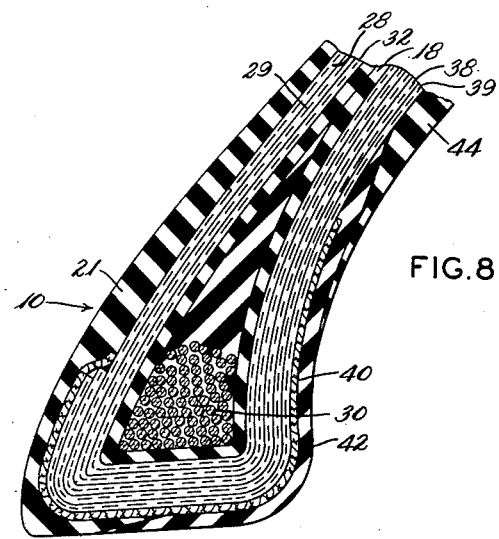
Figure 7:
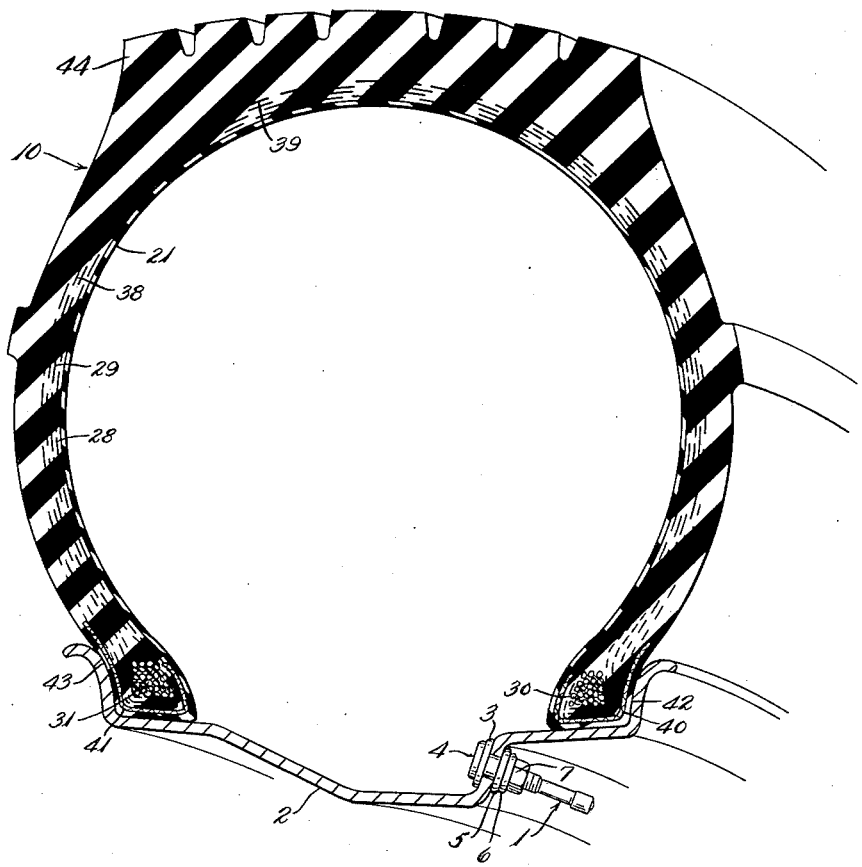
Figure 9:
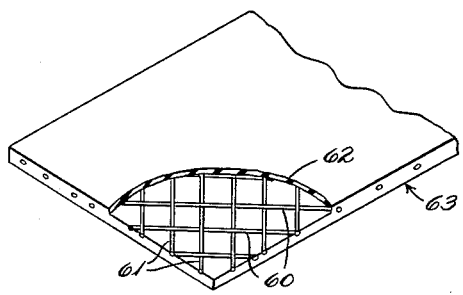
Figure 10:
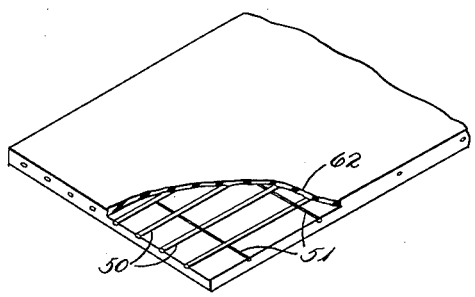
Figure 11:
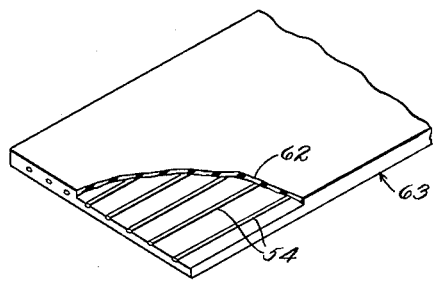
Figure 12:
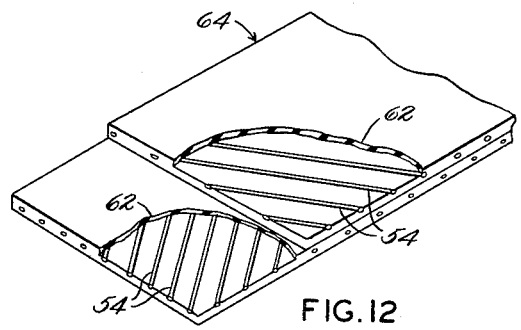
Figure 13:
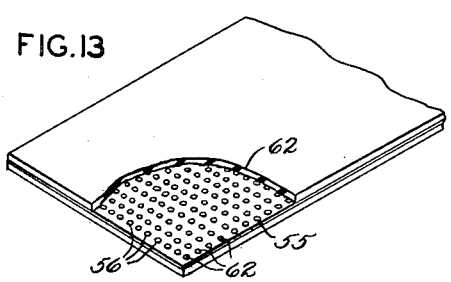

FIGS. 4, 5, and 6 are similar to FIG. 3, except in sectional view only, showing further successive steps in the building of the tire and showing the application of the impervious chafer in FIG. 6;

FIG. 7 is a radial sectional view of a molded and vulcanized tire embodying the present invention and being composed of the components shown in FIG. 6 illustrating the manner in which the inner liner and impervious chafer are employed in combination with said tire;

FIG. 8 is an enlarged fragmentary view in section of the bead portion of FIG. 7;

FIG. 9 is a fragmentary perspective view of a rubberized bias cut, open weave monofilament chafer, illustrating a preferred form of the novel impervious chafer;

FIGS. 10, 11 and 12 are fragmentary perspective views of rubberized chafer fabric, partially broken away and in section, illustrating other forms of monofilaments the invention contemplates; and FIG. 13 is similar to FIG. 10 except that a perforated sheet of air-impervious material is substituted for the monofilaments to show in FIG. 10.

Figure 1:
FIG. 1 is a sectional view of a lining component for a tubeless tire embodying the present invention.
Figure 2:
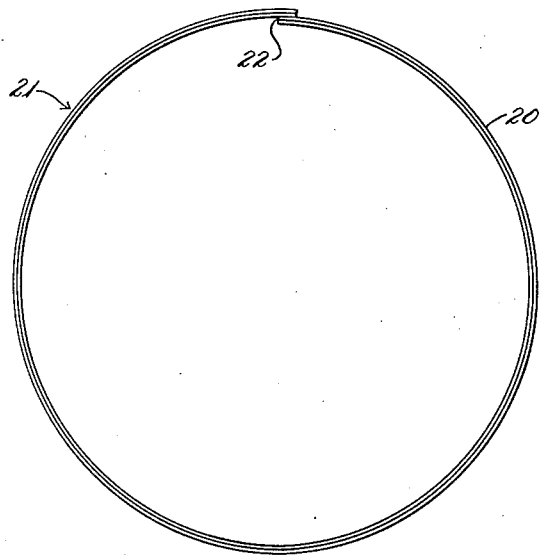
FIG. 2 is a side elevation of the lining of FIG. 1 shown formed into a band preparatory to being applied to a tire building drum.

Referring to FIG. 1 of the drawings, there is shown a cross-sectional view of a strip 20 of two plies of calendered air-impermeable rubber or butyl compound. Strip 20 is of such width as will completely line the inside of a tubeless tire, referred to generally at 10 in FIG. 7, in which it is to be used and having additional width to permit the edges of the strip to be turned radially outwardly about the bead edge portion of the tire after the chafers of said tire have been applied. Although such lining may be of any thickness found satisfactory, applicant has found .070" preferable for an 8.00–15 tire. Preparatory to applying the lining to a tire building drum, a suitable length is formed into a band 21 on a band building drum, not shown, the band having a transverse splice 22 of approximately ¼". Said assembly of band 21 is slipped upon said drum as shown in FIG. 3. Next, edge portions of band 21 are turned radially inwardly about the shoulders of the drum 24 to the position indicated by the phantom lines in FIG. 3. Tire plies of rubberized cotton, rayon or nylon cord fabric are next applied on the drum over band 21. Tire ply 28, and then ply 29 are applied in the usual manner of tire building, it being noted, however, that the edges of these plies are stitched about the shoulder of the tire drum over band 21 and said ply edges are permitted to remain extending loosely radially inwardly over the shoulder of the drum. It has also been found desirable to have ply 28 somewhat wider than ply 29, thus providing a step-off between the edges of these plies as shown. After plies 28 and 29 are applied and stitched over the shoulders of the drum as just explained, tire beads 30 and 31, having bead covers 18, 19 and flippers or tire bead reinforcing strip 32, 33, respectively, are placed by bead seating rings or otherwise, in position at the shoulders of the drum against ply 29. Gum strips 34 and 35 are placed over the edges of said flippers 32 and 33, respectively, following a common practice in tire building.

Referring now to FIG. 5, plies 28 and 29 are next turned up and back as indicated in the drawing. Gum strips 36 and 37 are then applied over the edges of the turned back edges of plies 28 and 29 also in accordance with a common practice. Next, single plies 38 and 39 are drawn about the drum in superimposed relation to plies 28 and 29 and the other components of the tire previously assembled. The edges of plies 38 and 39 are turned down as indicated in the drawings after which chafers 40 and 41 are applied to ply 39 at the shoulders of said building drum. Next, the edges of lining 20 are turned radially outwardly about the lower edge of the tire beads and over said chafers 40 and 41 a distance that results in lining 20 terminating at the toe of the bead of the tire, as shown in FIG. 8. The succeeding operation is the application of rubber abrasive strips 42 and 43. These latter strips being disposed over said chafing strips and extending a short distance beyond the edges thereof. An unvulcanized tire tread 44 is disposed about the previously assembled components of the tire in the usual manner of drum building of tires after which tire drum 24 is collapsed and the assembled, so-called green, tire removed therefrom, preparatory to molding and vulcanization.

For example, but without limitation, chafers 40 and 41 comprise warp and filling threads or elements, each of which consists of a single filament of nylon, said chafers having a construction, for example, but without limitation, .009" gauge square woven into a fabric having a 25 x 25 count per inch. The example results in an open woven fabric. Open woven fabric defines a fabric wherein the warp and filling elements touch each other only at their point of crossing. This fabric is rubberized by being run through a rubber cement bath, then dried and calendered by skim coating first side, frictioning second side and skim coating second side to an over-all gauge of .035". In the present illustration, FIG. 9, the side chafers are 2¼" wide for said 8.00–15 tire and are set 1¼" from the outside edge of bead, FIG. 5, which brings the chafers a short distance around the toes of the beads in the finished tire, FIGS. 7 and 8, thereby providing said chafers over the complete radial inner and the lateral outer surface of the tire beads. The chafers just described in addition to being impervious to air, have also proven better than chafers composed of cotton or rayon in abrasion resistance characteristics.

It is to be understood that while applicant prefers to use the nylon monofilament, or other more or less comparable impervious materials, such as Dacron, vinyl resin or saran, in woven form as illustrated in FIG. 9, the invention contemplates the use of such material or materials for chafers in perforated sheet form (FIG. 13) or unwoven parallel monofilament strip form (FIGS. 11 and 12), or in the form of a warp or monofilaments bound together by weak weft or pick threads (FIG. 10) as hereinafter more particularly described.

The term "Dacron" is a trade name for a synthetic plastic, having the composition:

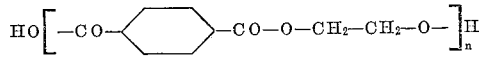

where $n$ is a relatively large number.

The abrasion which the tire beads receive in service, and gouging from tire tools to which they are subjected, often expose the fabric of chafer 40 at the tire rim. In the case of tires which have been in service a long time, such exposure of the chafers is almost always present since one of the chafer's functions, as indicated by its name, is to protect the tire beads from injury due to chafing against the metal tire rims. Chafers in tubeless tires are required for the same purpose as in conventional tires, but since chafers become exposed they present a serious problem in tubeless tire constructions which depend on an air tight seal between the beads of the tire and the tire rim, to retain the inflationary air in the tire. In such tires, the inflationary air has only to travel to the toe of the tire bead or slightly beyond to contact the exposed chafer. Heretofore, when said inflationary air contacted the multifilament cotton, rayon or nylon cord fabric of the prior art chafers, it passed freely along the full length of the cords and spread throughout the chafer strip to cause loss of internal tire pressure and tire ply separation. Chafers of the present invention overcome this fault of the prior art chafers since the inflationary air cannot pass through the warp or weft monofilaments or sheets of chafers 40 and 41.

Referring to FIG. 7, tire 10 is shown mounted upon rim 2. A conventional inflating valve 1 is mounted in fluid tight connection with tire rim 2 having a seal therewith by means of a rubber washer 3 disposed between the base 4 of valve 1 and rim 2; also a rubber gasket 5 between a rim washer 6 and rim 2. Washers 3 and 6 are pressed against the rim 2 by means of a nut 7 as will be understood by those familiar with the art. If desired, valve 1 may be welded to or otherwise attached to rim 2 to establish a fluid tight relation therebetween.

Referring again to FIGURES 9, 10, 11, 12 and 13 in detail, the strips of FIGS. 9 and 12 are bias cut from a sheet rubberized on a calender in the usual manner. The strips of FIGS. 10, 11 and 13 are portions of the rubberized sheet before being bias cut into chafer strip widths.

FIG. 9 illustrates a preferred arrangement of monofilaments of air impervious material in an open-weave fabric wherein the warp threads 60 and filling thread 61, of a bias cut strip 63, of proper width, for a tire chafer, is embedded, in rubber 62. The arrangement of monofilaments shown in FIG. 10 is that of a so called weakweft fabric wherein the warp threads 50 are each monofilaments, for example, of nylon .009" in diameter and the weft cords 51 are each very small monofilaments. As in FIG. 9 the fabric is embedded in rubber 62.

The arrangement of monofilaments 54 shown in FIG. 11 is of a strip 63 wherein the monofilaments are of air impervious material and are disposed in spaced parallel relation by so called creel fabric method.

FIG. 12 illustrates a strip 64 of proper width for a tire chafer composed of superimposed bias cut strips of creel fabric similar to the strip 63 but with the filaments 54 of one strip at an angle of approximately 90° to the filaments of the other of the superimposed strips. This arrangement provides a strip having more resistance to distortion than the strip 63 has.

The embodiment shown in FIG. 13 utilizes a perforated sheet 55 of air impervious material which may be of the same material as that of said monofilaments referred to hereinabove. Applicant prefers sheet 55 to be approximately .009" thick and the perforations 56 to be about ⅛" in diameter, and the total area of the perforations to equal approximately 50% of the total area of the sheet in which they occur. As will be seen by reference to FIG. 13 rubber 62 forms rivets through said perforations which rivets join the rubber on each side of the sheet 55 whereby the union between the sheet and the rubber is strengthened.

It will be seen that applicant has provided a new and improved tire construction. The invention has been explained, in one embodiment, in connection with a chafer comprising a fabric woven with spaced warp and filling threads, each of which consists of a single monofilament of nylon, and in another embodiment with threads of single monofilaments, arranged in spaced parallel relation. Also a further embodiment is described wherein a rubberized sheet of air impervious material is employed. Such sheet material may be imperforate (not shown) if roughened for adhesion, but in the form shown in FIG. 13 is perforated for mechanical adhesion. Obviously other modifications of the invention will occur to those familiar with the art.

The detailed description of the particular embodiments of the invention illustrated and described herein is not to be construed as limiting the invention thereto. The invention includes all features of patentable novelty residing in the foregoing description and the accompanying drawings.

What is claimed is:

1. An open-bead type pneumatic tubeless tire comprising a chafer strip of open weave fabric, the filling and warp elements of said fabric each being composed of a single monofilament of nylon.

2. In a pneumatic tubeless tire comprising a carcass formed of a plurality of plies of suitable material, a pair of beads embedded at the radial inner edges of said carcass, and a chafer extending about the radial inner and lateral outer portions of each of said beads, said chafer including a fabric of open weave, the filling and warp elements of said fabric each consisting of a single monofilament of air impervious material.

3. In a pneumatic tubeless tire construction comprising, a carcass formed of a plurality of plies of suitable material, a pair of beads embedded at the radial inner edges of said carcass, and a chafer extending about the radial inner and lateral outer portions of each of said beads, said chafer including a fabric of open weave, the filling and warp elements of said fabric each consisting of a single monofilament of approximately .009" gauge air impervious material.

4. In a pneumatic tubeless tire of the open-bead type comprising a pair of inextensible beads about its radial inner edges, said edges having chafers therein each consisting of an open weave strip of fabric embedded in rubber, said fabric having filling and warp elements each consisting of a single monofilament of air impervious material, one lateral edge of said strip terminating adjacent the inside of the tire and the opposite lateral edge terminating adjacent the outside of the tire.

5. An open bead type pneumatic tubeless tire comprising a chafer strip, said strip being formed of woven fabric having filling and warp elements, each of said elements consisting of a single monofilament of air impervious material.

6. An open-bead type pneumatic tubeless tire comprising a chafer strip of open weave fabric, the filling and warp elements of said fabric each consisting of a monofilament of vinyl resin.

7. An open-bead type pneumatic tubeless tire comprising an abrasion-resistant chafer strip composed of air impervious fabric composed of a sheet of parallel monofilament nylon elements.

8. An open-bead type pneumatic tubeless tire comprising a chafer of air impervious fabric of parallel abrasion-resistant plastic monofilaments.

9. A pneumatic tubeless tire having open bead portions, said bead portions having chafers of rubberized open weave, air-impervious nylon monofilaments.

10. A pneumatic tire having open bead portions, said bead portions having chafers of rubberized spaced parallel nylon monofilaments, and an outer covering of precured abrasion resistant rubber stock adhered to said chafers.

References Cited in the file of this patent
UNITED STATES PATENTS
2,592,844    Antonson _____ Apr. 15, 1952